US011255083B2

(12) United States Patent
Batten et al.

(10) Patent No.: US 11,255,083 B2
(45) Date of Patent: Feb. 22, 2022

(54) SOLIDS TRANSFER PUMP WITH MODULAR COMPONENTS

(71) Applicant: Thermaco, Incorporated, Asheboro, NC (US)

(72) Inventors: William C. Batten, Asheboro, NC (US); Bruce Kyles, Asheboro, NC (US)

(73) Assignee: Thermaco, Incorporated, Asheboro, NC (US)

( * ) Notice: Subject to any disclaimer, the term of this patent is extended or adjusted under 35 U.S.C. 154(b) by 1 day.

(21) Appl. No.: 16/764,602

(22) PCT Filed: Nov. 14, 2018

(86) PCT No.: PCT/US2018/060882
§ 371 (c)(1),
(2) Date: May 15, 2020

(87) PCT Pub. No.: WO2019/103885
PCT Pub. Date: May 31, 2019

(65) Prior Publication Data
US 2020/0385975 A1    Dec. 10, 2020

Related U.S. Application Data

(60) Provisional application No. 62/589,095, filed on Nov. 21, 2017.

(51) Int. Cl.
*E03F 5/16* (2006.01)
*B01D 21/00* (2006.01)
(Continued)

(52) U.S. Cl.
CPC ............ *E03F 5/16* (2013.01); *B01D 21/0012* (2013.01); *B01D 21/0018* (2013.01);
(Continued)

(58) Field of Classification Search
CPC ............ B01D 17/0214; B01D 21/0012; B01D 21/0018; B01D 21/003; B01D 21/2477; C02F 1/40; E03F 5/16
(Continued)

(56) References Cited

U.S. PATENT DOCUMENTS 1,200,951 A    10/1916 Kelly
1,630,504 A  *  5/1927 Walker ................. B01D 35/005
                                                    210/307
(Continued)

FOREIGN PATENT DOCUMENTS

CA    2175265        10/1996
DE    3330087    *   3/1985
(Continued)

OTHER PUBLICATIONS

International Search Report for PCT Application No. PCT/US2018/060882 dated Mar. 21, 2019.
(Continued)

Primary Examiner — Christopher Upton
(74) Attorney, Agent, or Firm — MacCord Mason PLLC (57) ABSTRACT

An F.O.G. separation apparatus includes a tank for receiving a liquid effluent flow containing water, F.O.G., and gross solids. The tank has a chamber, an inlet in an inlet module, a downstream section and an outlet in an outlet module. The inlet module has a weir for the effluent downstream of a strainer to strain gross solids from the effluent. A pump upstream of the strainer pumps water and solids that do not pass through the strainer. The pump's rotatable vertical shaft has a motor at an upper and an impeller at the bottom. A pipe connected to the inlet module near the impeller conveys solids and water when the pump is activated and directs the solids and water to the outlet. F.O.G. and water entering the tank pass to the downstream section where the F.O.G. is
(Continued)

removed from the water by a skimmer, and the residual water exist the tank through the outlet module.

20 Claims, 6 Drawing Sheets

(51) Int. Cl.
    *B01D 35/027*     (2006.01)
    *C02F 1/40*     (2006.01)
    *B01D 21/24*     (2006.01)
    *C02F 101/32*     (2006.01)
    *C02F 103/32*     (2006.01)

(52) U.S. Cl.
    CPC ....... *B01D 21/2477* (2013.01); *B01D 35/027* (2013.01); *C02F 1/40* (2013.01); *C02F 2101/32* (2013.01); *C02F 2103/32* (2013.01)

(58) Field of Classification Search
    USPC ....... 210/801, 803, 804, 307, 311, 312, 521, 210/523, 540
    See application file for complete search history.

(56) References Cited

U.S. PATENT DOCUMENTS

| | | | |
|---|---|---|---|
| 1,864,511 A | 6/1932 | Jones | |
| 2,010,540 A | 8/1935 | Evans | |
| 2,216,300 A * | 10/1940 | Shenk | E03F 5/16 210/307 |
| 2,824,645 A | 2/1958 | Griffith | |
| 3,363,764 A * | 1/1968 | Whitaker | B01D 21/0012 210/313 |
| 3,481,474 A * | 12/1969 | Paulson | B01D 29/908 210/312 |
| 3,872,017 A | 3/1975 | Bishop | |
| 4,038,185 A | 7/1977 | Kline | |
| 4,132,645 A | 1/1979 | Bottomley | |
| 4,214,887 A | 7/1980 | vanGelder | |
| 4,400,274 A * | 8/1983 | Protos | B01D 17/0214 210/521 |
| 4,783,272 A | 11/1988 | Patterson | |
| 4,814,092 A | 3/1989 | Patzelt | |
| 5,030,357 A * | 7/1991 | Lowe | E03F 5/16 210/804 |
| 5,098,584 A | 3/1992 | Leen | |
| 5,308,504 A | 5/1994 | Keyes | |
| 5,360,555 A | 11/1994 | Batten | |
| 5,543,064 A | 8/1996 | Batten | |
| 5,804,081 A | 9/1998 | DeGesero | |
| 5,861,098 A * | 1/1999 | Morrison | B01D 17/0214 210/801 |
| 5,951,878 A | 9/1999 | Astrom | |
| 6,059,963 A | 5/2000 | Horakova | |
| 6,096,228 A | 8/2000 | Angelle | |
| 6,174,446 B1 | 1/2001 | Andresen | |
| 6,224,331 B1 | 5/2001 | Hayward | |
| 6,491,830 B1 * | 12/2002 | Batten | B01D 21/0012 210/803 |
| 6,506,310 B2 | 1/2003 | Kulbeth | |
| 6,755,980 B1 | 6/2004 | Van Den Born | |
| 6,800,195 B1 * | 10/2004 | Batten | B01D 17/0214 210/307 |
| 6,849,176 B1 | 2/2005 | Batten et al. | |
| 6,878,280 B2 | 4/2005 | McDowell | |
| 6,951,615 B2 * | 10/2005 | Tripodi | E03F 5/16 210/540 |
| 7,306,731 B1 | 12/2007 | DeWaard | |
| 7,427,356 B2 | 9/2008 | Chapin | |
| 7,473,376 B2 | 1/2009 | Peloquin | |
| 7,514,011 B2 | 4/2009 | Kulbeth | |
| 7,520,997 B2 | 4/2009 | Antoun | |
| 7,556,154 B2 | 7/2009 | Astleford | |
| 7,815,800 B2 * | 10/2010 | Komatsu | E03F 5/16 210/307 |
| 7,892,438 B2 | 2/2011 | Nielson | |
| 8,002,996 B1 | 8/2011 | Pickney | |
| 8,142,667 B2 | 3/2012 | Dewaard | |
| 8,153,004 B2 * | 4/2012 | Rodriguez-Jovet | B01D 17/0214 210/521 |
| 8,900,463 B2 | 12/2014 | Sowerby | |
| 2002/0185458 A1 | 12/2002 | Portman | |
| 2007/0045202 A1 | 3/2007 | Peloquin | |
| 2009/0184066 A1 | 7/2009 | Nielsen | |

FOREIGN PATENT DOCUMENTS

| | | |
|---|---|---|
| GB | 2216821 A | 10/1989 |
| JP | H9117798 A | 5/1997 |
| RU | 115349 U1 | 5/2012 |

OTHER PUBLICATIONS

Written Opinion for PCT Application No. PCT/US2018/060882 dated Mar. 21, 2019.
"Gain Efficiency with Volute Design" Published on Pumps & Systems (http://www.pumpsandsystems.com); May 25, 2016.
"Fully Recessed Impeller Pumps" Egger Torp Pumps North America, Inc.; date unknown.
"Vortex Pumps" ESSCO Vortex 100% Recessed Impeller Pumps (http://esscopumps.com/vortexpumps/vortexpumpindex.htm); Jun. 27, 2016.
"Durco Mark 3 Recessed Impeller Pump" Flowserve; date unknown.

* cited by examiner

SOLIDS TRANSFER PUMP WITH MODULAR COMPONENTS

BACKGROUND OF THE INVENTION

The present invention relates to improvements in solids handling for effluent streams containing solids. The typical effluent stream for which the present invention is suitable is the discharge from a kitchen, particularly a restaurant kitchen. These discharges can include a number of components including oils and greases, various food waste solids and, of course, water. These discharges from kitchens are not suitable to be sent directly to a sewage treatment plant, largely because of the presence of the fat, oil and grease components (hereinafter referred to as F.O.G.). Sewage pipes and treatment plants do not handle these components well, and many local codes require F.O.G. removal from kitchen effluent. This has traditionally been done in an in-ground grease trap. More recently, F.O.G. separators have been available on the market to remove the F.O.G. components.

For example, the Lowe Engineering Company of Lincoln Park, N.J. makes products of this type, as shown in U.S. Pat. Nos. 4,051,024; 4,268,369 and 5,030,357. In addition, the assignee of the present application, Thermaco, Inc. of Asheboro, N.C. manufactures and sells F.O.G. removal apparatus under the trademark BIG DIPPER. Exemplary of the patents owned by Thermaco are U.S. Pat. No. 4,235,726 to Shimko and U.S. Pat. No. 5,133,881 to Miller et al. The disclosure of these two patents is hereby incorporated by reference. What the various patents have in common is the presence of a skimmer which is hydrophobic and oleophilic, meaning that water does not wet the surface, but F.O.G. does. The surface is passed through the upper surface of quiescent F.O.G. and water in a holding chamber. As the surface emerges, oil sticks to it, but water does not, so the F.O.G. can be scraped off and diverted to a separate storage container. The water is permitted to pass downstream through an exit in the lower part of the apparatus.

In the past, these devices have infeed units including a straining basket into which the solids are directed and trapped to remove them from the flow so they do not interfere with the F.O.G. removal process. It was up to a restaurant employee to periodically open the unit and remove the strainer and dump its contents. The strainers are objectionable to handle because the solids may have strong odors. Also, the solids will have been immersed in the waste water, which will drip out of the basket. Thus, great care must be exercised to prevent the waste material from getting on the clothing of the person emptying the strainer basket. Also, since this is an unpleasant chore, sometimes it's not done. If the strainer basket fills and is not emptied, the F.O.G. separator unit ceases to be able to receive and transmit flows. The facility in which the device is installed will experience a failure, such as sinks not draining or upstream flows pooling in floor drains.

Finally, in larger units, the strainer baskets are so large that when they are relatively full, the weight of the basket of material to be dumped is great enough so as to injure the worker emptying the strainer.

One way to avoid the need for emptying strainer baskets is disclosed in U.S. Pat. No. 5,360,555 to Batten, the entire disclosure of which is incorporated herein by reference. Later, a water jet eductor was developed, as disclosed in U.S. Pat. No. 6,491,830. Both approaches have had some success, but there continues to be a need in the art for an improvement in devices of this nature to eliminate the problems caused by the presence of strainer baskets.

SUMMARY OF THE INVENTION

The present invention fulfills one or more of these needs in the art by providing an F.O.G. separation apparatus that includes a tank for receiving a liquid effluent flow containing water, F.O.G., and gross solids. The tank includes a chamber, an inlet in an inlet module, a downstream section and an outlet in an outlet module. The inlet module has an exit weir for the liquid effluent flow downstream of a strainer to strain gross solids from the liquid effluent flow and a pump upstream of the strainer to pump water and gross solids that do not pass through the strainer. The pump has a rotatable vertical shaft having a motor at an upper end of the shaft and an impeller at the bottom end of the shaft. A pipe connected to the inlet module near the impeller receives and conveys solids and water when the pump is activated and to direct the solids and water to the outlet. An F.O.G. separator located in the downstream section removes F.O.G. from water held in the downstream section. Thus, the gross solids entering the tank settle in the inlet module for periodic removal by the pump and fine solids flow with the effluent to the downstream section and then to the outlet. F.O.G. and water entering the tank pass to the downstream section where the F.O.G. is removed from the water, and the residual water exits the tank through the outlet module with fine solids.

The inlet module may have a bottom which slopes downwardly toward the impeller of the pump. A timer may be used to turn the pump on for a preset period at a preset time. A weight-controlled switch can be included in the inlet module to turns the pump on when a preset weight of solids has been collected in the inlet module and turn the pump off subsequently.

The pump may include a pump support having a drive shaft for the pump impeller. The pump support may have wings that nest in valleys in the inlet module.

The inlet module may have a bottom which slopes downwardly to a well, with the impeller of the pump positioned within the well to discharge effluent and solids to the pipe.

The inlet module may have stand-offs at a front side to space the inlet module from an inside face of the chamber. The inlet module may be rotomolded with molded fittings for the weir, strainer and pump.

The outlet module may have a depending wall to allow water from a low part of the chamber to exit the tank, along with water that has been pumped by the pump in the inlet module. The strainer may be a removable cylindrical strainer.

The invention can also be considered as an F.O.G. separation method that includes introducing a liquid flow containing water, F.O.G. and solids into a tank having an inlet module, a downstream section and an outlet in an outlet module, permitting the solids entering the inlet module to settle as water and F.O.G. flow over a weir from the inlet module to the downstream section, periodically rotating a vertical drive shaft of a pump in the inlet module to propel the solids from the inlet module with some water through a pipe to the outlet module, removing F.O.G. from the water in the downstream section, and permitting the residual water to exit the tank through the outlet.

Permitting F.O.G. and water to pass from the inlet module to the downstream section may include passing the F.O.G. and water over a weir that maintains a higher static water level in the inlet module than the static water level in the downstream section.

Straining gross solids from the liquid flow in the inlet module may prevent passage of gross solids to the downstream section. The periodic removal of solids may take place for preset periods at a preset times. The periodic removal of solids may start when a preset weight of solids has been collected in the inlet module and end when the solids have been depleted from the inlet module.

The method may include the preliminary step of mounting the pump in the inlet module by positioning the pump impeller in a well molded into the inlet module and positioning wings on a pump support of the pump in valleys molded into the inlet module.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

An F.O.G. separator 10 is shown in the Figures with a solids accumulating and discharging capability. A tank 12 has an inlet 14 (see FIG. 2) at inlet end 15 and an outlet 16. The inlet 14, which can be connected to a drain from a kitchen sink or the like, allows the kitchen sink effluent to deposit in an inlet module 18. One edge of inlet module 18 is defined by a weir 28 upstanding from the bottom portion of the chamber 12. That side of the inlet module also has stand-offs 17 so that side of the module 18 is spaced from the inside face of the chamber in tank 12. Effluent flows over the weir 28 into the so-defined space and on to a quiescent region 20. The weir 28 is positioned at a height above a weir 21 formed in outlet module 22. The weir 21 defines the static water level in the quiescent region 20 of the chamber, including where the skimmer 19 is positioned. Thus, the static water level in the inlet module 18 is preferably higher than the static water level in the quiescent region 20. In operation, the F.O.G. and solids and water pass into the inlet module 18 from inlet 14. The F.O.G. and water pass over the weir 28. The gross solids settle on the sloping bottom 24, which, under the influence of gravity directs them to the pump 32.

In the quiescent region 20, F.O.G. and water reside for a long enough period of time so that the F.O.G. floats to the top of the water. The floating F.O.G. can be removed in conventional fashion using any desired F.O.G. separator 19 (shown schematically in FIG. 1) such as those shown in the abovementioned patents.

More examples and details of suitable F.O.G. separators may be found in U.S. Pat. No. 6,800,195 to Batten et al. and U.S. Pat. No. 7,208,080 to Batten et al. which are both herein incorporated by reference in their entireties. Other types of skimmers can be used in the invention, too, including but not limited to: belt skimmers, examples of which can be seen in U.S. Pat. No. 7,427,356 to Chapin and U.S. Pat. No. 7,296,694 to Weymouth; skimmers that include one or more rotating cylinders that partially or completely submerge, one example as is shown in U.S. Pat. No. 4,051,024 to Lowe et al; skimmers with an affinity for F.O.G and/or skimmers that include non-cylindrical grease collectors pivoting to come into contact with F.O.G. for removal, one example as seen in U.S. Pat. No. 4,235,726 to Shimko.

The effluent water, with F.O.G. removed, passes under baffle 40 (see FIG. 2) to enter the outlet module 22. When the water reaches the elevation of the weir 21, it can flow out through the outlet 16 from the outlet module 22 and the chamber 12. From there it can be passed on to a downstream device, such as a sewer pipe or the like.

Figure 1:
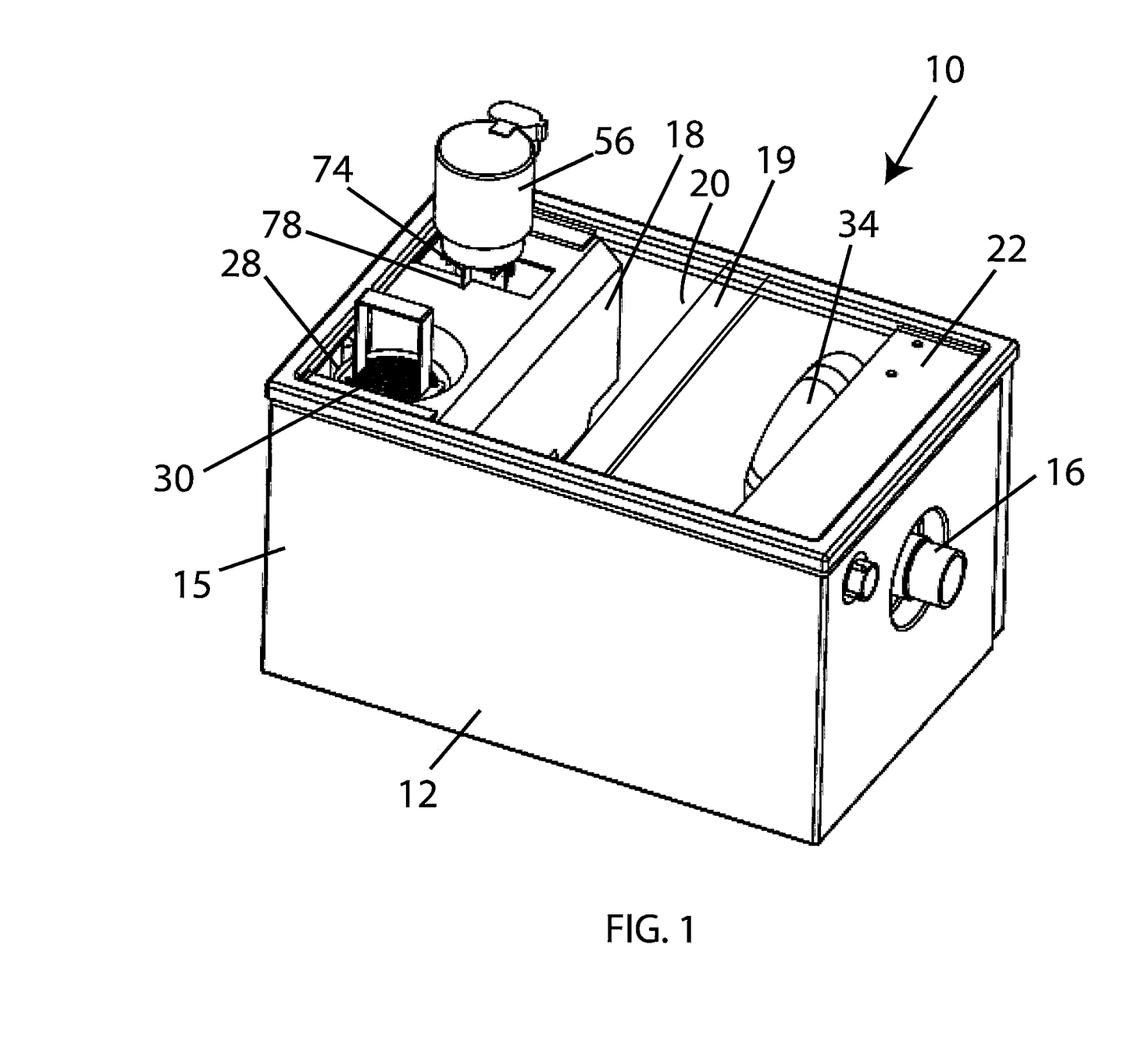
FIG. 1 is a top perspective view of an embodiment of a separator in accordance with the invention with covers removed.
Figure 4:
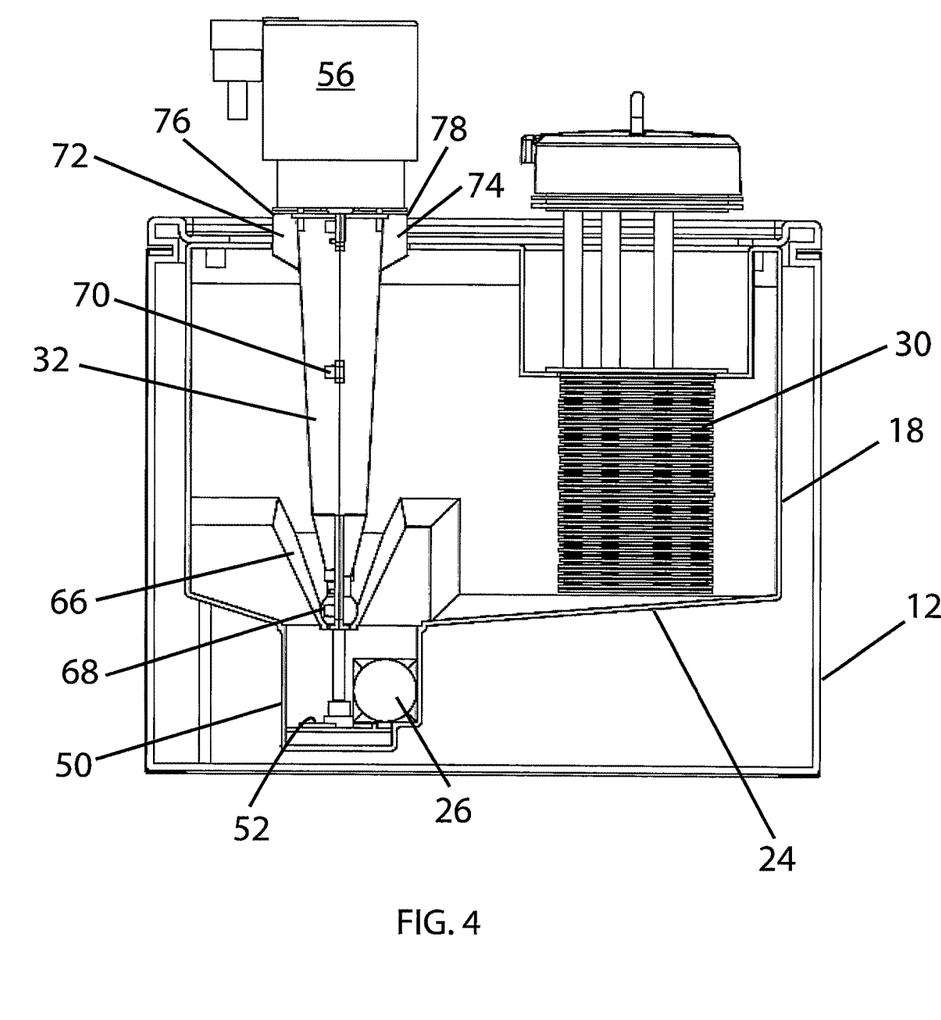
FIG. 4 is a sectional view of the embodiment of FIG. 2 taken along lines 4-4 and looking in the direction of the arrows.
Figure 5:
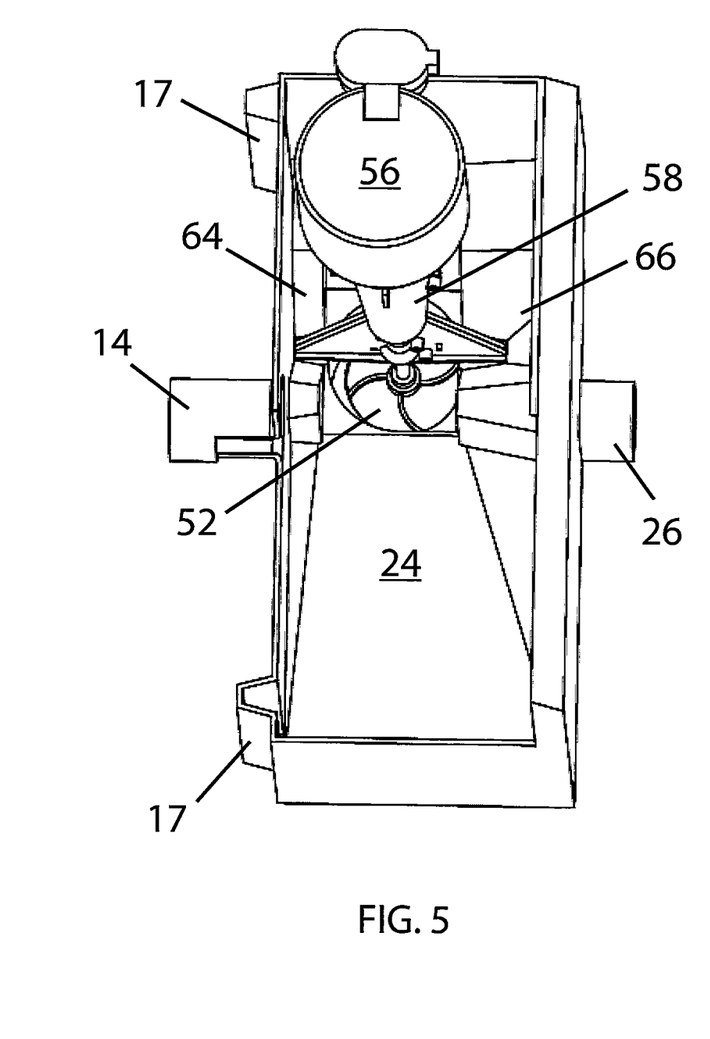
FIG. 5 is a top view of the inlet module showing the relation of the pump components in the module.
Figure 6:
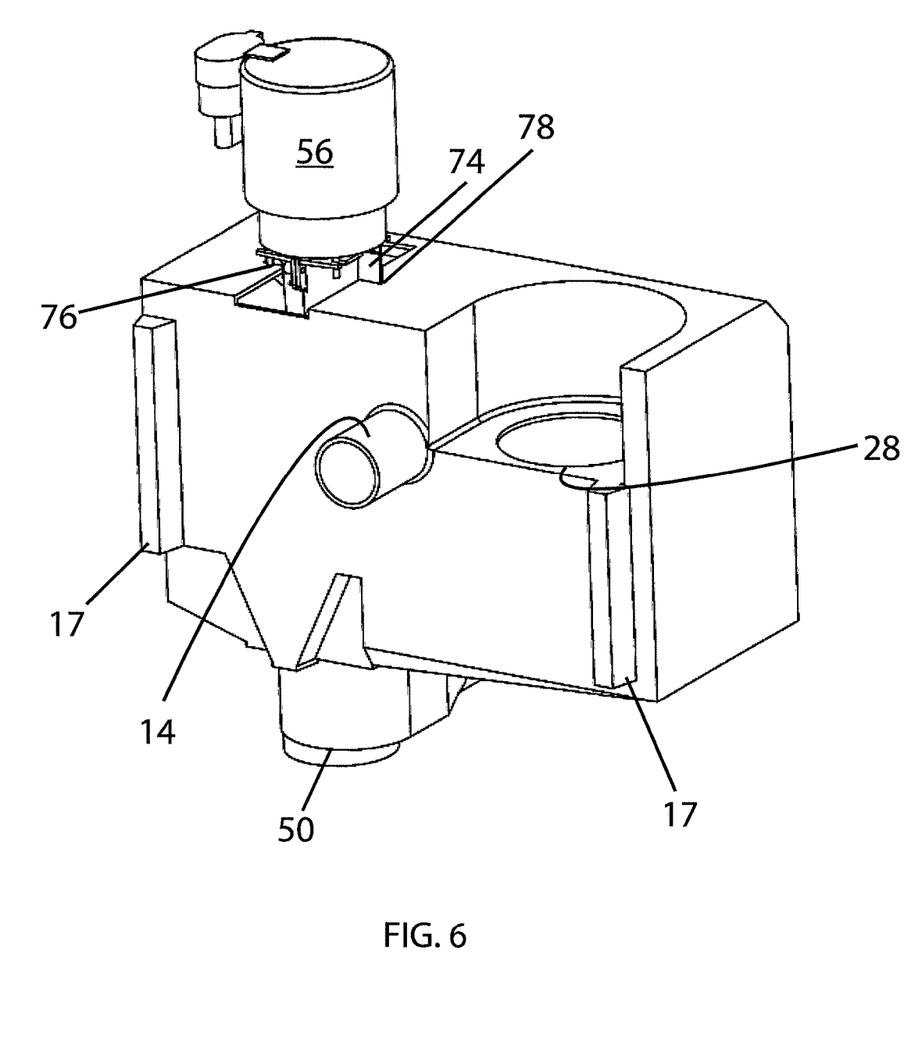
FIG. 6 is an elevation view of the inlet side of the inlet module.

The inlet module 18 is provided with a removable cylindrical screen 30 having a handle, as seen in FIG. 1. Liquid effluent from the inlet 14 passes through the screen, trapping gross solids in the inlet module 18, so the liquid effluent (and fine solids that can pass through the screen) can flow over the weir 28 free of larger, gross solids. As best seen in FIGS. 4 and 5, the inlet module 18 is provided with a sloping bottom 24. At the bottom of the slope 24 is an outlet 26 adjacent the impeller 52 of pump 32. Pump 32 is made up of an impeller 52 that cooperates with inside surfaces of the inlet module 18 that act as the pump's volute.

Figure 2:
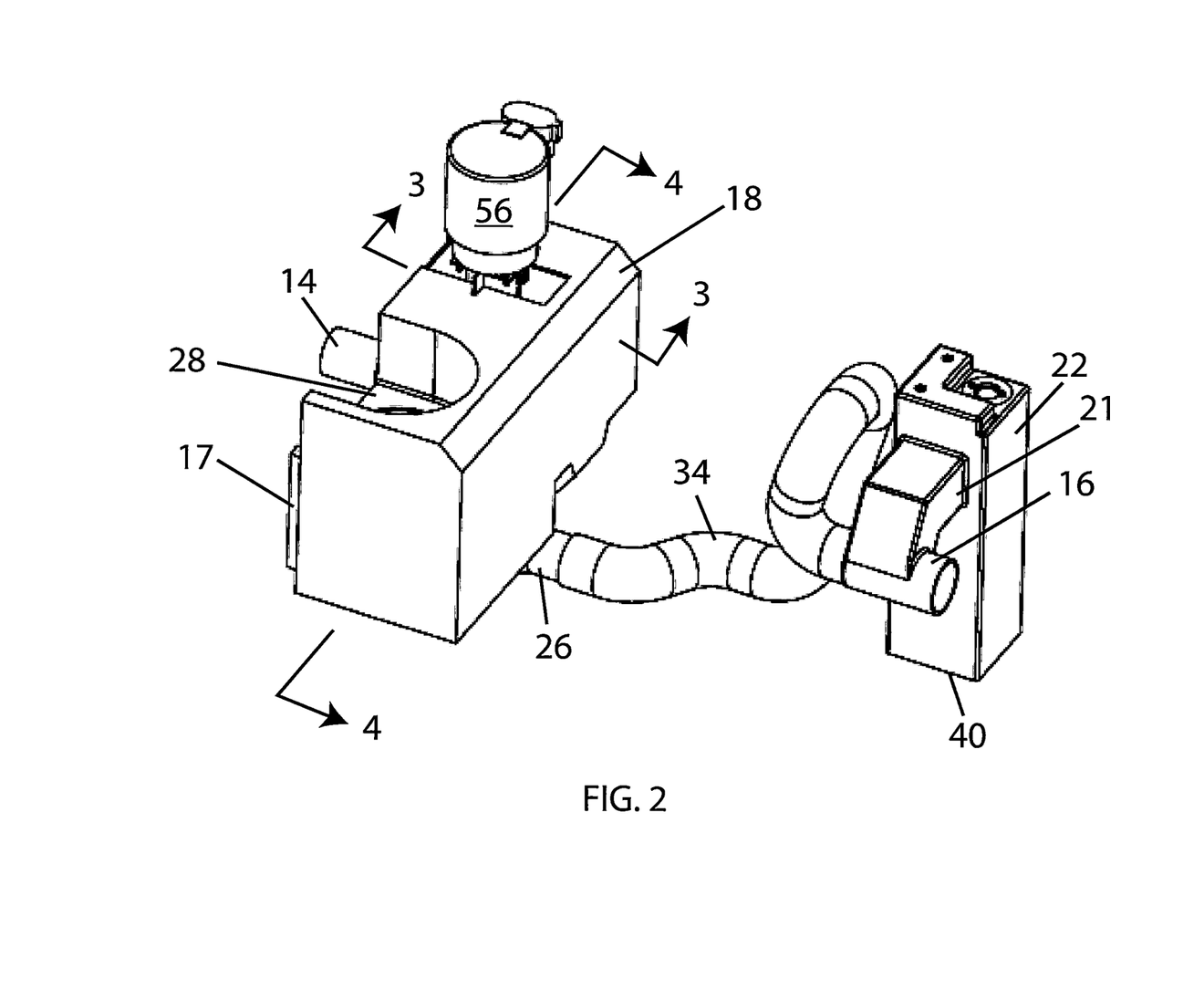
FIG. 2 is a top perspective view of a the embodiment of FIG. 1, with the covers, tank, skimmer and strainer basket removed.
Figure 3:
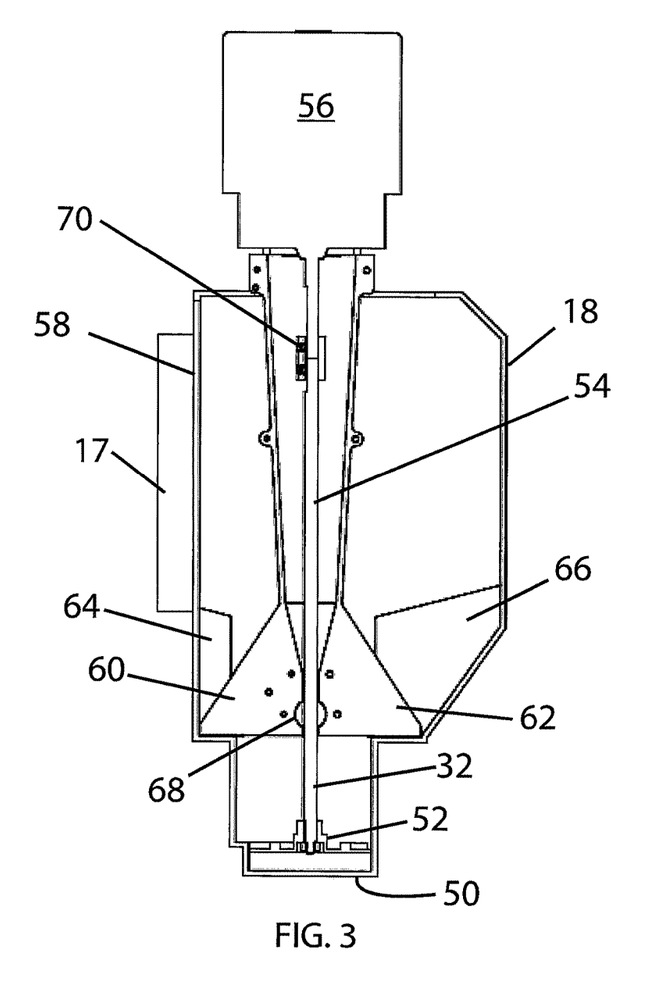
FIG. 3 is a sectional view of the embodiment of FIG. 2 taken along lines 3-3 and looking in the direction of the arrows.

The inlet module 18 is formed with a well 50 as seen in FIGS. 3 and 4, and the pump 32 has its impeller 52 mounted for rotation about a vertical axis near the bottom of the well. The impeller is connected via shaft 54 to drive motor 56 as seen in FIG. 3. The shaft 54 rotates within a pump support 58 that has mounting fins 60, 62 that seat in valleys 64, 66 in the sidewalls of the inlet module 18. Wings 72, 74 on the pump support 58 similarly position the top of pump support 58 in notches 76, 78 at the top of inlet module 18. The shaft 54 is supported within pump support 58 by bearing 68. A coupling 70 is included in the embodiment shown to lengthen the shaft 54 of an off-the shelf motor. This arrangement of the pump support 58 within the inlet module 18 allows for easy removal in case repair or replacement of the motor and/or impeller is needed. This construction positions the electrical motor 56 above the liquid in the tank 12. The outlet of the pump 32 is connected via pipe 34 to the outlet 16 below the weir 21. A pipe 34 has a rise to an upper run as shown in FIG. 2 before dropping to connect to the outlet 16. The inlet module is advantageously rotomolded to shape the molded fittings for the weir, strainer mount and pump elements (i.e. the sloping bottom 24, well 50, valleys 64, 66, and notches 76, 78). The outlet module may also be rotomolded.

A switch may be provided below the sloping bottom 24, with a connection to the pump 32. When the weight of solids deposited on the sloping bottom 24 is sufficient, the switch will close, turning on the pump 32. When pump 32 is turned on, solids deposited in the inlet module 18 are propelled and discharged along with water from the inlet module 18 along pipe 34 to the outlet 16.

As the liquid is introduced into module 18 through the inlet 14, F.O.G. and water pass through the strainer or screen 30 and overflow the weir 28 to a level lower than the inlet 14. Solids do not pass over the weir 28 because they are blocked by the screen or strainer 30. When the pump 32 is activated, the flow of water in module 18 reverses from the normal flow to backwash the strainer 30 and remove solids which may have become lodged in the strainer. However, very little F.O.G. passes out through the pump 32 and pipe 34 because having passed over weir 28, it does not make a return journey, even under the suction of the pump. The water and F.O.G. pass over the weir 28 to the quiescent separation module 20, where the F.O.G. is removed by the skimmer. The remaining water and fine solids exit through the module 22 to the outlet 16.

When a sufficient quantity of solids has collected on the sloping bottom 24 to activate the switch, pump 32 is activated, thus discharging the solids along with the water from the inlet module 18 along the pipe 34 to the outlet 16. When the amount of solids is depleted, the switch opens, turning off the pump 32. A sufficient quantity of water passes with the solids to maintain fluidity through the pipe 34 and outlet 16. As further liquid enters the separator 10 through the inlet 14, the liquid and solids build up again in module 18, with the F.O.G. passing over the weir 28 for removal.

An alternate way to activate the pump 32 could be timer, instead of the switch. The timer periodically activates the pump 32 to discharge whatever solids may be collected and continue to run for a preset period of time. For example, the pump may be turned on for thirty seconds every thirty minutes. Other control mechanisms for the pump may be substituted, as will be apparent to those of ordinary skill in the art. The control mechanism for the pump may be combined with the control mechanism for the skimmer 19.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An F.O.G. separation apparatus comprising:
a tank for receiving a liquid effluent flow containing water, F.O.G., and gross solids, the tank including a chamber, an inlet in an inlet module, a downstream section and an outlet in an outlet module, wherein the inlet module has stand-offs at a front side to space the inlet module from an inside face of the chamber,
the inlet module having a strainer, an exit weir for the liquid effluent flow downstream of the strainer so gross solids are strained from the liquid effluent flow over the weir, a pump upstream of the strainer to pump water and gross solids that do not pass through the strainer, the pump being configured as a rotatable vertical shaft having a motor at an upper part of the shaft and an impeller at the bottom part of the shaft,
a pipe connected to the inlet module near the impeller to receive and convey solids and water when the pump is activated and to direct the solids and water to the outlet module, and
an F.O.G. separator located in the downstream section for removing F.O.G. from water held in the downstream section,
whereby the gross solids entering the tank settle in the inlet module for periodic removal by the pump and fine solids flow with F.O.G. and water entering the tank to the downstream section where the F.O.G. is removed from the water, and residual water exits the tank through the outlet module with fine solids.

2. An F.O.G. separation apparatus as claimed in claim 1 wherein the inlet module has a bottom which slopes downwardly toward the impeller of the pump.

3. An F.O.G. separation apparatus as claimed in claim 1 further comprising a timer which turns the pump on for a preset period at a preset time.

4. An F.O.G. separation apparatus as claimed in claim 1 further comprising a weight-controlled switch in the inlet module, which turns the pump on when a preset weight of solids has been collected in the inlet module and turns the pump off subsequently.

5. An F.O.G. separation apparatus as claimed in claim 1 wherein the inlet module has a bottom which slopes downwardly to a well and the impeller of the pump is positioned within the well to discharge effluent and solids to the pipe.

6. An F.O.G. separation apparatus as claimed in claim 1 wherein the inlet module is rotomolded with molded fittings for the weir, strainer and pump.

7. An F.O.G. separation apparatus as claimed in claim 1 wherein the outlet module has a depending wall that terminates above the bottom of the chamber to allow water from a low part of the tank to pass under the depending wall so it can exit the tank, along with water that has been pumped by the pump in the inlet module.

8. An F.O.G. separation apparatus as claimed in claim 1 wherein the strainer is a removable cylindrical strainer.

9. An F.O.G. separation apparatus comprising:
a tank for receiving a liquid effluent flow containing water, F.O.G., and gross solids, the tank including a chamber, an inlet in an inlet module, a downstream section and an outlet in an outlet module,
the inlet module having a strainer, an exit weir for the liquid effluent flow downstream of the strainer so gross solids are strained from the liquid effluent flow over the weir, a pump upstream of the strainer to pump water and gross solids that do not pass through the strainer, the pump being configured as a rotatable vertical shaft having a motor at an upper part of the shaft and an impeller at the bottom part of the shaft, wherein the pump includes a pump support housing a drive shaft for the pump impeller and the pump support has wings that nest in valleys in the inlet module,
a pipe connected to the inlet module near the impeller to receive and convey solids and water when the pump is activated and to direct the solids and water to the outlet module, and
an F.O.G. separator located in the downstream section for removing F.O.G. from water held in the downstream section,
whereby the gross solids entering the tank settle in the inlet module for periodic removal by the pump and fine solids flow with F.O.G. and water entering the tank to the downstream section where the F.O.G. is removed from the water, and residual water exits the tank through the outlet module with fine solids.

10. An F.O.G. separation apparatus as claimed in claim 9 wherein the inlet module has stand-offs at a front side to space the inlet module from an inside face of the chamber.

11. An F.O.G. separation apparatus as claimed in claim 9 wherein the inlet module has a bottom which slopes downwardly toward the impeller of the pump.

12. An F.O.G. separation apparatus as claimed in claim 9 further comprising a timer which turns the pump on for a preset period at a preset time.

13. An F.O.G. separation apparatus as claimed in claim 9 further comprising a weight-controlled switch in the inlet module, which turns the pump on when a preset weight of solids has been collected in the inlet module and turns the pump off subsequently.

14. An F.O.G. separation apparatus as claimed in claim 9 wherein the inlet module has a bottom which slopes downwardly to a well and the impeller of the pump is positioned within the well to discharge effluent and solids to the pipe.

15. An F.O.G. separation apparatus comprising:
  a tank for receiving a liquid effluent flow containing water, F.O.G., and gross solids, the tank including a chamber, an inlet in an inlet module, a downstream section and an outlet in an outlet module, the inlet module having stand-offs at a front side to space the inlet module from an inside face of the chamber,
  the inlet module having a removable cylindrical strainer, an exit weir for the liquid effluent flow downstream of the removable cylindrical strainer to strain gross solids from the liquid effluent flow, a pump upstream of the strainer to pump water and gross solids that do not pass through the strainer, the pump being configured as a rotatable vertical shaft having a motor at an upper end of the shaft and an impeller at the bottom end of the shaft, the pump including a pump support housing a drive shaft for the pump impeller, the pump support having wings that nest in valleys in the inlet module, the inlet module having a bottom which slopes downwardly to a well and the impeller of the pump being positioned within the well to discharge effluent and solids, wherein the inlet module is rotomolded with molded fittings for the weir, strainer and pump,
  a pipe connected to the inlet module near the impeller to receive and convey solids and water when the pump is activated and to direct the solids and water to the outlet module, wherein the outlet module has a depending wall to allow water and fine solids from a low part of the tank to exit the tank along with water that has been pumped by the pump in the inlet module, and
  an F.O.G. separator located in the downstream section for removing F.O.G. from water held in the downstream section,
  whereby the gross solids entering the tank settle in the strainer in the inlet module for periodic removal by the pump and fine solids are conveyed over the weir along with F.O.G. and water to pass to the downstream section where the F.O.G. is removed from the water, and the residual water and fine solids exit the tank through the outlet module.

16. An F.O.G. separation method comprising
  in a tank having an inlet module, a downstream section, and an outlet in an outlet module, mounting a pump in the inlet module by positioning the pump impeller in a well molded into the inlet module and positioning wings on a pump support of the pump in valleys molded into the inlet module,
  introducing a liquid flow containing water, F.O.G. and solids into a tank having an inlet module, a downstream section and an outlet in an outlet module,
  permitting the solids entering the inlet module to settle as water and F.O.G. to flow over a weir from the inlet module to the downstream section,
  periodically rotating a vertical drive shaft of a pump in the inlet module to propel the solids from the inlet module with some water through a pipe to the outlet module,
  removing F.O.G. from the water in the downstream section, and
  permitting the residual water to exit the tank through the outlet.

17. An F.O.G. separation method as claimed in claim 16 wherein permitting F.O.G. and water to pass from the inlet module to the downstream section includes passing the F.O.G. and water over a weir that maintains a higher static water level in the inlet module than the static water level in the downstream section.

18. An F.O.G. separation method as claimed in claim 17 further comprising straining gross solids from the liquid flow in the inlet module to prevent passage of gross solids to the downstream section.

19. An F.O.G. separation method as claimed in claim 16 wherein the periodic removal of solids takes place for preset periods and at a preset times.

20. An F.O.G. separation method as claimed in claim 16 wherein the periodic removal of solids starts when a preset weight of solids has collected in the inlet module.

* * * * *